US007111409B2

(12) United States Patent
Janssen

(10) Patent No.: US 7,111,409 B2
(45) Date of Patent: Sep. 26, 2006

(54) DEVICE AND METHOD PROVIDING A STRAIGHT EDGE ALONG AN OBJECT

(75) Inventor: Eric G. Janssen, St. Louis, MO (US)

(73) Assignee: Janssen Building and Development Corp., Inc., St. Louis, MO (US)

( * ) Notice: Subject to any disclaimer, the term of this patent is extended or adjusted under 35 U.S.C. 154(b) by 0 days.

(21) Appl. No.: 10/441,494

(22) Filed: May 20, 2003

(65) Prior Publication Data

US 2004/0231174 A1 Nov. 25, 2004

(51) Int. Cl.
*G01B 3/10* (2006.01)

(52) U.S. Cl. ......................... 33/555.4; 33/755; 33/21.1

(58) Field of Classification Search ............... 33/555.1, 33/555.4, 413, 755, 759, 529, 21.1, 21.3, 33/32.1, 32.2, 41.1
See application file for complete search history.

(56) References Cited

U.S. PATENT DOCUMENTS 846,461 A * 3/1907 Engel .......................... 33/755
1,381,075 A * 6/1921 Louden ...................... 33/555.4
1,535,980 A * 4/1925 Campbell et al. ............ 33/21.3
2,155,705 A * 4/1939 Gottwald .................... 33/21.3
3,209,459 A 10/1965 Fish, Jr.
3,407,507 A * 10/1968 Brubaker ................... 33/555.4
4,211,011 A * 7/1980 Jacobson ..................... 33/759
4,441,258 A * 4/1984 McDaniel et al. ............ 33/759
4,922,622 A * 5/1990 Galloway .................. 33/555.4
D319,794 S 9/1991 Elkins
5,067,246 A * 11/1991 Hesske et al. ............. 33/555.4
5,255,556 A * 10/1993 Lobdell ..................... 73/31.02
5,269,069 A * 12/1993 Min .......................... 33/555.4
5,450,677 A 9/1995 Casey
5,613,302 A * 3/1997 Berman et al. ............ 33/555.4
5,732,475 A * 3/1998 Sacks et al. ............... 33/555.4
5,774,999 A * 7/1998 Smith ........................ 33/555.4
6,612,048 B1 * 9/2003 Peterlechner et al. ......... 33/755
6,640,460 B1 * 11/2003 Nabarro et al. ............... 33/759
2002/0184779 A1 * 12/2002 Bohnengel ................. 33/555.4

* cited by examiner

*Primary Examiner*—G. Bradley Bennett
(74) *Attorney, Agent, or Firm*—Evan R. Sotiriou; The Small Patent Law Group LLP

(57) ABSTRACT

A device for providing a generally straight edge along a surface of an object includes a generally cylindrical body and a locking component for engaging the device with the object. The generally cylindrical body is configured having multiple layers that may be aligned to provide a straight edge for use in marking an object or as a guide when cutting an object. The generally cylindrical body may be flexible for further maintaining the device around an object.

27 Claims, 3 Drawing Sheets

DEVICE AND METHOD PROVIDING A STRAIGHT EDGE ALONG AN OBJECT

FIELD OF THE INVENTION

This invention relates generally to devices allowing for marking and/or cutting objects, and more particularly to a device providing a straight edge along the surface of an object, especially for use in marking and/or cutting the object.

BACKGROUND OF THE INVENTION

It is often desirable and/or necessary to accurately prepare a surface of an object to be cut or otherwise modified. For example, when cutting pipes or tubes for connection with other pipes or tubes, or cutting cylindrical concrete forms, a cut square and true to the longitudinal axis is required to ensure proper connection of the pipes and/or placing a cut edge flat and tight against a flat perpendicular surface and/or for creating a flat square surface when pouring concrete in the concrete form (e.g., a SONOTUBE®). Failure to provide a straight cut within certain tolerances may require subsequent modification in an attempt to correct the variation and often still is not acceptable for use, thereby resulting in additional cost.

For example, if the cut on the bottom edge of the concrete form is not cut square and does not fit tight against an existing footing, the wet concrete will seep from beneath the concrete form causing lift to the concrete form (e.g., concrete form tube) and waste in concrete material. The seepage also builds up around the outside base of the concrete form. This build up must be removed in order to remove the concrete form from, for example, a pier pour once the concrete sets, as removal of the concrete from the concrete pour is typically a code requirement. Additional costs also may result including the time and material cost for cutting another pipe or form and wasted material from improper cuts. In some cases, part of a project may have to be performed again as a result of a failure to provide straight cuts (e.g., repouring concrete supports within cylindrical forms to provide a flat top support surface).

It is known to use a measuring device, such as a tape measure, for example, when marking an object to provide guide marks for use in cutting the object. For example, when marking cylindrical tubes or any type of cylindrical object for cutting (e.g., by providing marks for use in making a straight cut), numerous measurements are required to provide guide marks along the outer circumference of the tube for use when cutting the object (e.g., making a mark every inch along the circumference of a tube a predetermined distance from the end of the tube). This process may be susceptible to user error. For example, incorrect measuring or variations in the marks may be due to the measuring device not being used parallel with the longitudinal axis of the object while placing each individual mark. The measured distance becomes shortened with each degree of variance from true parallel of the longitudinal axis of the object being made by the user and is very time consuming. Further, this process is required for each and every cut, even if each object is to be cut to the same length. Additionally, if the end from which measurements are being made is not square and straight (e.g., ends of cylindrical object are cut uneven), it is difficult to ensure that the guide marks will be straight and requires additional time (e.g., different measurements to compensate for uneven reference edge). As the length and diameter of the tubes to be cut increases, so does the time required to prepare the cylindrical object for cutting and the likelihood of errors.

Templates and other marking devices are also known for marking objects, particularly objects to be cut. However, these known templates and marking devices often fail to provide accurate marking and are time consuming, difficult to use and not conducive to field work.

Thus, known devices and methods often fail to provide accurate marking of an object to be cut (e.g., accurately marking straight lines around the surface of an object to be cut) and require extra time and effort to use (e.g., difficult to maintain in proper orientation against an object to be marked). Further, these known devices and methods often fail to provide flexibility in accurately and easily marking different types and sizes of objects, especially objects that are to be cut in the field (e.g., on a job site) or have a larger diameter (e.g., diameter greater than six inches).

SUMMARY OF THE INVENTION

Various embodiments of the present invention include a device and method for use in providing a generally straight edge along a surface of an object for use, for example, in marking or guiding the cutting of the object (e.g., marking a straight line along the outside surface of the object, such as a straight circumferential line around the outside surface of a cylindrical tube or pipe for use in cutting the tube or pipe). The device is configured for secure removable engagement with the surface of the object (e.g., outside circumferential surface) to be marked and/or cut, and may be used in connection with different types and sizes of objects. For example, the device may be used in connection with generally cylindrical, square or rectangular shaped objects of any length or position, whether installed or not installed (e.g., existing plumbing pipes, steam lines, air lines, gas lines, ducts, etc.).

In one embodiment of the present invention, a device providing a generally straight edge along a surface of an object includes a generally cylindrical body having a plurality of layers and configured for engagement to an object, and a locking component for removably engaging the generally cylindrical body to the object to provide a generally straight edge along a surface of the object and perpendicular to a longitudinal axis of the object. The generally cylindrical body may be provided as a single sleeve and is preferably flexible. Further, the plurality of layers may be configured to form a concentric circular cross-section, and wherein edges of the plurality of layers are configured to form the generally straight edge when aligned.

In another embodiment of the present invention, a method of providing a straight edge along a surface of an object includes providing a plurality of circumferential layers forming a sleeve for engagement on an object, and forming a generally straight edge along an outside surface of the object and perpendicular to a longitudinal axis of the object, with the straight edge formed by aligning the plurality of circumferential layers. The method also may include providing a locking component for removably securing the sleeve to the object, which may also use the force of friction to maintain the secured position.

Further areas of applicability of the present invention will become apparent from the detailed description provided hereinafter. It should be understood that the detailed description and specific examples, while indicating certain preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference numerals represent corresponding parts throughout the several views of the drawings.

DETAILED DESCRIPTION OF THE PREFERRED EMBODIMENTS

The following description of preferred embodiments is merely exemplary in nature and is in no way intended to limit the invention, its application, or uses. Although various embodiments of a device of the present invention for use in providing a generally straight edge along a surface of an object may be described having specific component parts and for use with objects have particular shapes and sizes, it is not so limited, and the component parts may be modified or changed for use with objects having different shapes and sizes.

Figure 1:
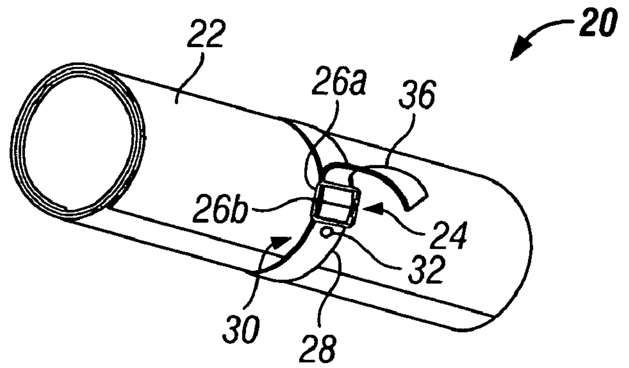
FIG. 1 is a perspective view of an embodiment of a device of the present invention for providing a generally straight edge along a surface of an object.
Figure 2:
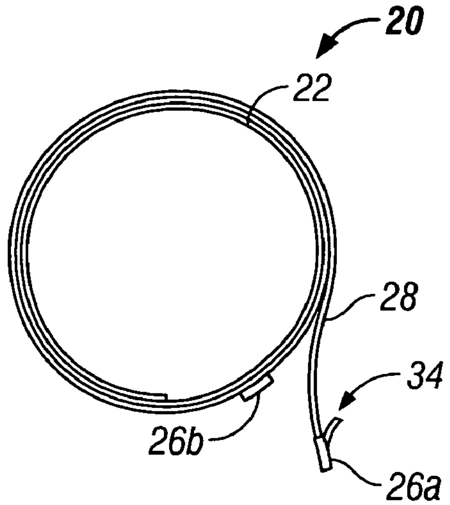
FIG. 2 is an end elevation view of an embodiment of a device of the present invention for providing a generally straight edge along a surface of an object.
Figure 3:
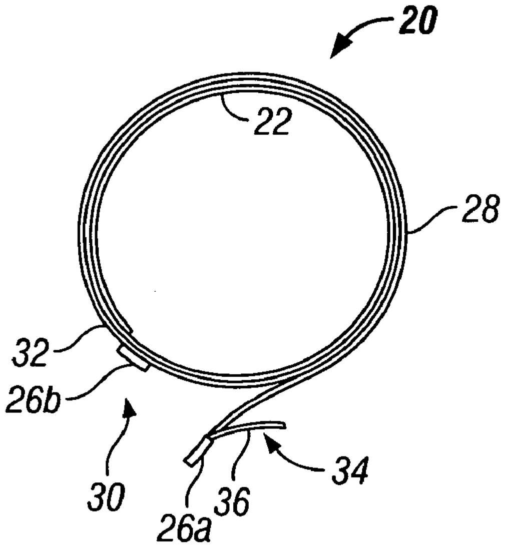
FIG. 3 is an end elevation view of the device of FIG. 2 in an expanded position.

In general, various embodiments of a device of the present invention provide a generally straight edge along a surface of an object, and more particularly, a straight edge transverse or perpendicular to an axis of the object (e.g., perpendicular to the longitudinal axis of the object). The various embodiments may be used, for example, for marking different types and sizes of objects or providing a guide for cutting the objects. Specifically, as shown in FIG. 1, one exemplary embodiment of a device 20 of the present invention includes a generally cylindrical body 22 (i.e., a body having a generally circular cross-section), which is more preferably constructed of a flexible material, and a locking component 24 for engaging the device 20 to an object. The generally cylindrical body 22 may be constructed, for example, as a sleeve configured for expansion to surround and engage different sizes and types of objects (e.g., pipes and tubes of different sizes and shapes). More preferably, and as shown in a non-expanded position in FIG. 2, the generally cylindrical body 22 scrolls or winds around and within itself (e.g., resulting from the flexible material used to construct the generally cylindrical body 22) to form a multi-layer configuration (e.g., forms a sleeve having a concentric circular cross-section). In an expanded position as shown in FIG. 3, the generally cylindrical body 22 may be expanded to accommodate different sizes of objects (e.g., objects having different circumferences).

Further, the locking component 24 in various embodiments generally includes complimentary locking portions 26*a* and 26*b* adapted for releaseable engagement (e.g., connection) together to maintain an adjustable locking support 28 (e.g., strap) around the exterior surface of the generally cylindrical body 22 to engage and secure the device 20 to an object and may use the force of friction between the device 20 and object to maintain the position of the device 20 thereon (e.g., friction between surfaces may aid in maintaining the position of the device 20 on an object). For example, in one embodiment, one end 30 of the locking support 28 is securedly attached to the generally cylindrical body 22, for example, using a rivet 32 or other suitable securing means, and the other end 34 includes an adjustable portion 36, which may be, for example, a length of strap that may be adjusted using the locking portion 26*a*. In one embodiment, the locking component 24 may be configured having a snap-type locking arrangement (e.g., snap-type complimentary locking portions 26*a* and 26*b*) for maintaining a strap around the generally cylindrical body 22 when engaging an object (e.g., placed around an object) and to resist or prevent movement of the device 20 when engaged therewith (e.g., prevent movement along a tube to which the device 20 is engaged). However, it should be noted that other locking devices and supports may be used in combination with the device 20 for securing the device 20 to an object, for example different straps having various connection members.

Figure 4:
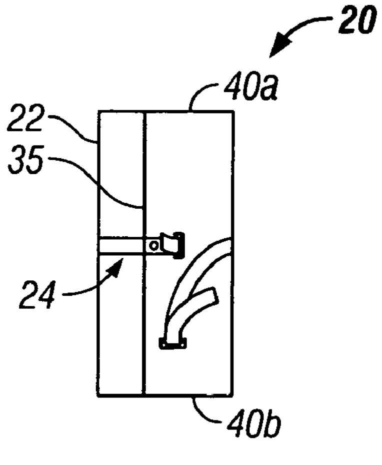
FIG. 4 is a side elevation view of the device of FIG. 1 showing the locking component in an unlocked position.

As shown more specifically in FIG. 4, the device 20 is configured such that generally straight edges 40*a* and 40*b* are parallel and are provided, for example, for use in marking an object (e.g., marking a straight line around the circumference of a tube perpendicular to the longitudinal axis) or for guiding the cutting of an object (e.g., used as a saw guide for a circular saw). Further, the multi-layer configuration as shown in FIG. 2, further ensures that when the device 20 is engaged with an object, the generally straight edges 40*a* and 40*b* are arranged to provide a continuous straight edge along the object (e.g., straight edge around the circumference of a tube) by lining up the edges of each of the layers (i.e., overlapping layers), for example, at any plane in a generally vertical plane.

Figure 5:
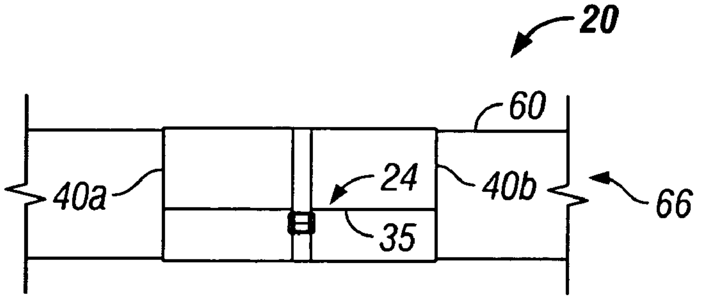
FIG. 5 is a side elevation view of the device of FIG. 1 engaged on an object.
Figure 6:
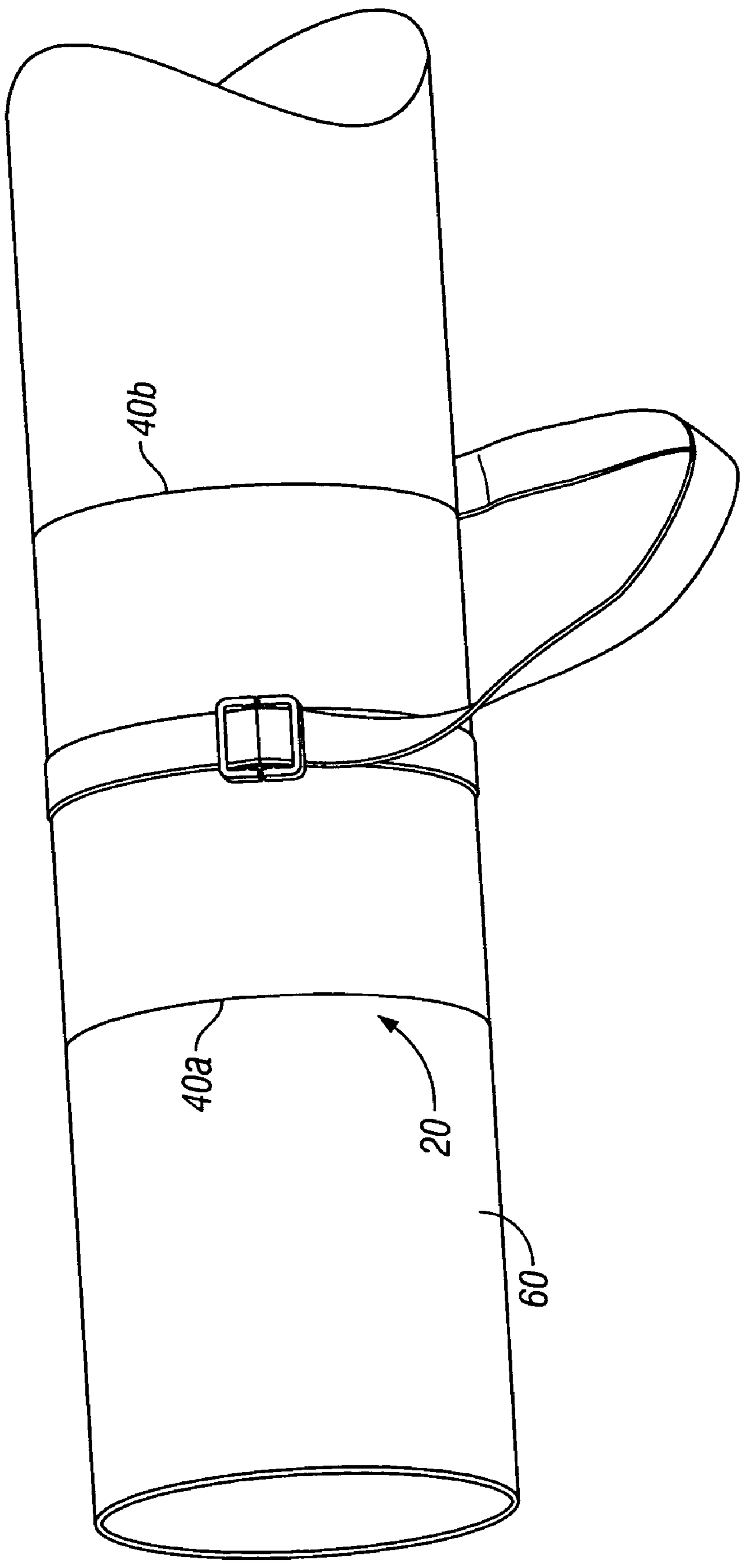
FIG. 6 is a perspective view of the device of FIG. 1 engaged on an object.

In operation, and as shown in FIGS. 5 and 6, the device 20 preferably engages an object (e.g., a tube) to provide a generally straight edge along a surface, and more particularly a generally straight edge on an outside surface of the object perpendicular to the longitudinal axis of the object, and positioned generally where a mark or cut is desired or needed. This position may be determined, for example, by an initial measurement from one end of the object using a tape measure and marking a single mark at a desired length. It should be noted that the initial measurement may be made in other ways, including, but not limited to any measuring device, such as a laser type measuring device, a level or by sight to square up an uneven end. An edge of the device 20 (e.g., generally straight edge 40*a* or 40*b*) is placed at the desired position as indicated by the mark. The generally cylindrical body 22 is then wrapped or wound around the object such that the device 20 is tight around the object (e.g., by pulling on an end 35 of the device 20) and the multiple layers, and specifically the overlapping edges, are aligned (i.e., each edge of a layer of the generally cylindrical body 22 flush with the edge of the layer above and/or below) to form the generally straight edge 40*a* or 40*b*. It should be noted that the generally cylindrical body 22 may be constructed of material such that resilient operation is also provided (e.g., resilient wrapping or winding of the generally cylindrical body 22 from an expanded position to a non-expanded position).

The locking component 24 is then used to secure and engage the generally cylindrical body 22 to the object (e.g., engage the device 20 around the object), which as shown in FIGS. 5 and 6, may be a generally cylindrical object 60 (e.g., cylindrical pipe or tube). For example, in one embodiment, the locking portions 26*a* and 26*b* are connected (e.g., snapped together) and the locking support 28 tightened (e.g., tightening a nylon strap) to resist or prevent movement of the aligned device 20 along the object 60, which may include the force of friction between the device 20 and object 60, thereby maintaining the generally straight edge 40*a* or 40*b* at the desired position.

A marking device (e.g., pencil) then may be used to mark a line on the object (e.g., around the outer circumference) using the generally straight edge 40*a* or 40*b* as a guide. For example, the generally straight edge 40*a* or 40*b* may be used to mark a generally straight circumferential line around the exterior surface of the cylindrical object 60 (e.g., cylindrical concrete form), and more preferably, a generally straight circumferential line that is perpendicular to the longitudinal axis of the cylindrical object 60. Thereafter, the device 20 may be removed from the object (i.e., releasing the locking component 24) with the straight line marked thereon, often referred to as a true or true square line. If additional lines are desired on the same object, the locking component 24 may be released while the device 20 is maintained around the object (i.e., not expanded) and moved to the next desired position for marking or cutting with the locking component 24 reengaged. The locking support 28 may need to be slightly readjusted (e.g., tightened), but in many instances will already be set to the appropriate length from use in making the first mark. Further, and as shown in FIG. 5, because when using the device 20, generally only a single mark at a predetermined position (e.g., predetermined length from the edge of the object 60) is needed, the device 20 easily may be used with objects having an uneven edge 66, without requiring calculations to adjust for the uneven edge (e.g., to make multiple marks from the edge along the circumference of the object at a desired position).

It should be noted that the device 20 may be used to perform additional or different functions other than for marking an object. For example, the device 20 may be used as a saw guide in combination with a saw (e.g., any saw with a cutting deck, such as a circular saw, jigsaw, reciprocating saw, etc.) for cutting an object without first marking a straight line. In particular, a mark is again made on the object at a predetermined point (e.g., predetermined length from one end of the object). The distance from the cutting blade to the outside edge of the cutting deck of the saw is then determined. The device 20 is then secured to the object with one of the generally straight edges 40*a* or 40*b* spaced from the mark a distance equal to the determined distance from the cutting blade to the outside edge of the cutting deck. The generally straight edge 40*a* or 40*b* is then used as a guide for the outside edge of the cutting deck when cutting the object (i.e., the outside edge of the cutting deck is placed against or abuts the generally straight edge 40*a* or 40*b* and is maintained against it while cutting).

Further, the device 20 may be used in connection with objects that do not have a circular cross-section, such as, for example, objects having a square cross-section. In such a case, the device 20 may connected to the object in the same manner as described above. Alternately, the device 20 may be provided such that the generally cylindrical body 22 is configured sufficiently thin to expand and conform to the shape of the object.

Various embodiments of a device 20 of the present invention may be used in connection with objects of different types and sizes, and may be configured having a different length or width, for example, for use with different ranges of sizes of objects (e.g., generally cylindrical body 22 having one and one-half, three, five or seven overlapping layers when not expanded for use with different ranges of diameters of objects).

Further, the locking component 24 allows for the device 20 to be used in connection with objects oriented in different directions (e.g., horizontally, vertically or sloped at an angle). Also, the device 20, and in particular, the multi-layer configuration of the generally cylindrical body 22, allows for aligning the edges of the multiple layers to ensure a straight line along the surface of the object.

The various embodiments of the device 20 are not limited to use in connection with specific objects, but may be used to mark or aid in guiding the cutting of different objects, including, but not limited to concrete form tubes, sewer pipes, steel pipes or casings, vent pipes, heat ducts, wood or plastic dowels, electric conduit (e.g., PVC or steel conduit), chimney pipe, fence posts or corrugated culvert pipe, having different shapes and sizes. Further, the shape of the device 20 is not limited to the generally cylindrical body 22 having a circular cross-section (e.g., oval cross-section). Further, the device 20 may be constructed to mark an object with a cross section that is, for example, oval, square, rectangular, triangular, elliptical, hexagonal, octagonal, I-Beam shaped, two sided angle shaped or three sided channel shaped. Further, it should be noted that the device 20 can also be used to make multiple marks on an object without requiring a separate measuring device.

Additionally, the device 20 may be modified as desired or needed for a particular application or use. For example, one or more locking components 24 with one or more locking supports 28 (e.g., straps) may be provided to secure the device 20 around two or more objects aligned in the same longitudinal axis to provide a temporary coupling of the objects (e.g., couple unused portions of two separate concrete forms). The coupled objects then may be cut as desired or needed, or for example, if concrete forms, may be filled with concrete and the device 20 removed after the concrete has set.

Figure 7:
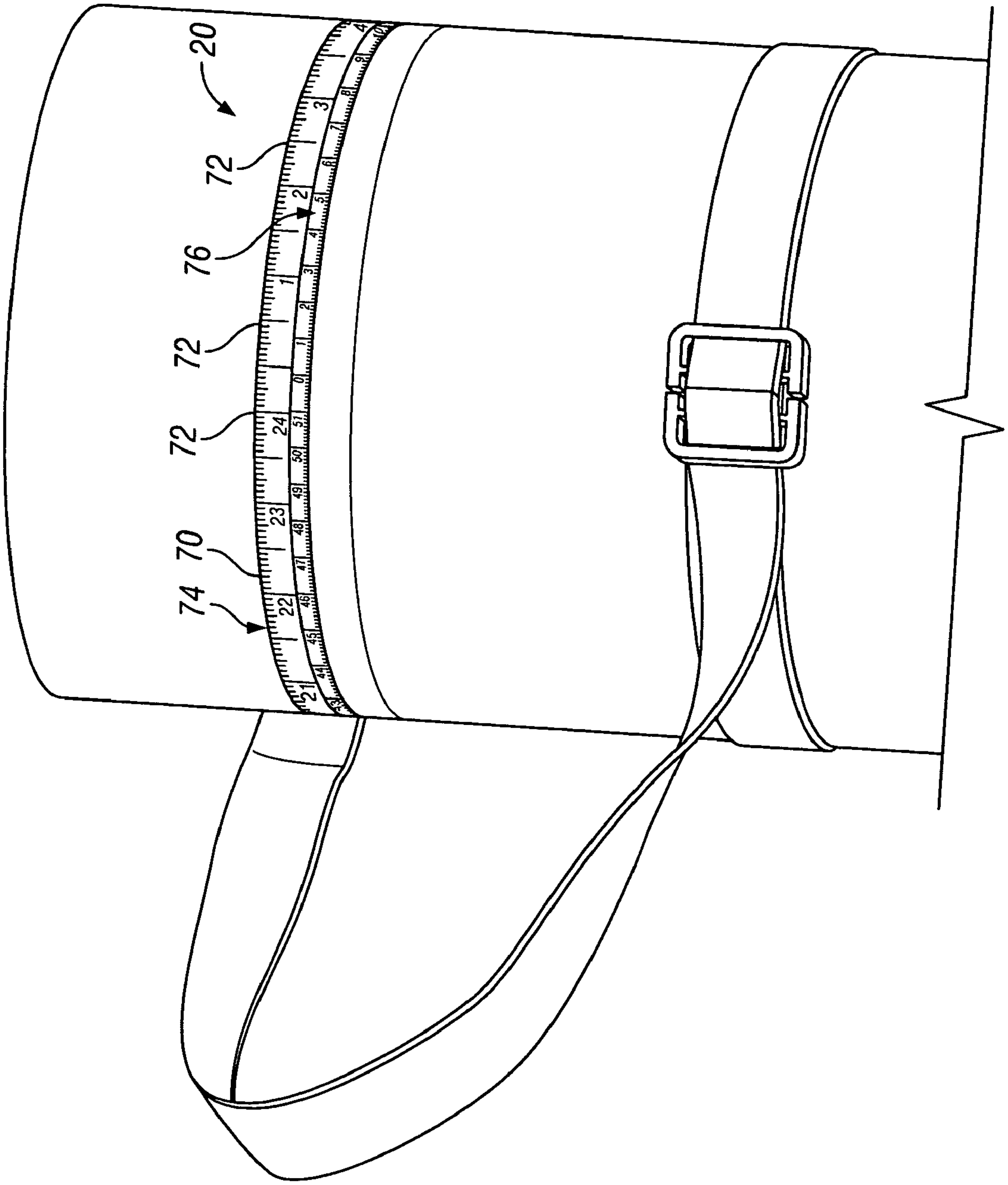
FIG. 7 is a perspective view of another embodiment of a device of the present invention having a measuring portion and engaged on an object.

The device 20 also may be modified, for example, to include measuring indications along the exterior of the generally cylindrical body 22 to allow for measurement of and determining the size of the object to which it is attached. For example, as shown in FIG. 7, the device 20 may have a measuring portion 70, which in one exemplary embodiment includes measuring indications 72 in both English and metric (e.g., inches and centimeters). The measuring portion 70 is preferably provided adjacent to or close to one or both of the generally straight edges 40*a* and 40*b*. The measuring portion 70 may be modified as desired or needed. For example, the measuring indications 72 may be provided such that on a top section 74 of the measuring portion 70 the measuring indications 72 indicate the circumference of the object to which the device 20 is connected and on a bottom section 76 of the measuring portion 70 the measuring indications 72 indicate the diameter of the object to which the device 20 is connected. The measuring indications 72 may be provided in English and metric or both.

The description of the various embodiments of the present invention is merely exemplary in nature and, thus, variations that do not depart from the gist of the invention are intended to be within the scope of the invention. Such variations are not to be regarded as a departure from the spirit and scope of the invention.

What is claimed is:

1. A device providing a generally straight edge along a surface of an object, the device comprising:

a generally cylindrical resilient unitary body having a plurality of layers and configured for winding engagement to an outside surface of art object; and a locking component configured to tighten around a middle portion of the generally cylindrical body and removably engage the generally cylindrical body to the object to provide a generally straight edge along a the outside surface of the object and perpendicular to a longitudinal axis of the object.

2. The device according to claim 1 wherein the generally cylindrical body comprises a single sleeve.

3. The device according to claim 1 wherein the generally cylindrical body is flexible.

4. The device according to claim 1 wherein the plurality of layers are configured to form a spiraling cross-section.

5. The device according to claim 1 wherein edges of the plurality of layers are configured to form the generally straight edge when aligned.

6. The device according to claim 1 wherein the locking component comprises an adjustable strap adapted for securing around the generally cylindrical body to removably engage the generally cylindrical body to the object.

7. The device according to claim 6 wherein the adjustable strap is secured to the generally cylindrical body.

8. The device according to claim 1 further comprising a plurality of locking components.

9. The device according to claim 1 further comprising a measuring portion.

10. The device according to claim 9 wherein the measuring portion comprises measuring indications.

11. The device according to claim 10 wherein the measuring indications are configured for measurement in at least one of English and metric measurements.

12. The device according to claim 10 wherein the measuring portion is configured to provide measuring indications indicating at least one of circumference and diameter of the object to which it is engaged.

13. The device according to claim 1 wherein the generally straight edge comprises a rigid edge formed by the plurality of layers.

14. A device providing a generally straight edge along a surface of an object, the device comprising:

a body having a generally circular cross-section configured to engage an object, the body integrally formed by a plurality of continuously extending circumferential layers; and extending at least one and a half times circumferentially around an outside surface of the object; and a locking component configured to extend circunaferentially around a middle portion of the generally cylindrical body for securing the body around the object and forming a generally straight edge along the outside surface of the object with the plurality of circumferential layers, the straight edge perpendicular to a longitudinal axis of the object.

15. The device according to claim 14 wherein the body comprises a generally flexible cylindrical sleeve.

16. The device according to claim 15 wherein the body is configured for resilient operation.

17. The device according to claim 14 wherein the locking component comprises an adjustable member and complimentary locking portions adapted for releasable engagement for removably securing the body around the object.

18. The device according to claim 17 wherein a portion of the locking component is fixedly secured to the body.

19. The device according to claim 14 wherein the plurality of circumferential layers are configured for alignment to form the generally straight edge.

20. The device according to claim 14 wherein the plurality of circumferential layers are configured to be wound within each other and around the object.

21. The device according to claim 14 wherein the body extends at least two times circumferentially around the object.

22. A method of providing a straight edge along a surface of an object, the method comprising:

providing a plurality of continuously extending circumferential layers forming a sleeve for engagement on an object;

recoiling the sleeve around an outside surface of the object;

tightening a locking component circumferentially around a middle portion of the sleeve to secure the sleeve to the outside surface of the object, and forming a generally straight edge along an outside surface of the object and perpendicular to a longitudinal axis of the object, the straight edge formed by aligning the plurality of circumferential layers extending at least one and half times circumferentially around the object.

23. The method according to claim 22 further comprising providing a locking component for removably securing the sleeve to the object.

24. The method according to claim 23 wherein the locking component is configured for adjustable operation and further comprising adjusting the locking component to secure the sleeve to the object.

25. A method of providing a straight edge along a surface of an object, the method comprising:

wrapping an element with a straight edge at least one and half times around an outside surface of an object, the element integrally formed by a plurality of continuously extending layers;

tightening a locking component circumferentially around a middle portion of the element to secure the element to the outside surface of the object; and aligning the wrapped straight edge to identify a generally straight line around the outside surface of the object and perpendicular to a longitudinal axis of the object.

26. The method according to claim 25 further comprising removably securing the wrapped element to the object.

27. The method according to claim 25 wherein the wrapping forms a plurality of circumferential layers and the step of aligning comprises aligning the plurality of circumferential layers to identify the generally straight line.

* * * * *